July 7, 1936. W. F. BRONSELL 2,046,766
PIPE PATCHING DEVICE
Filed May 19, 1934
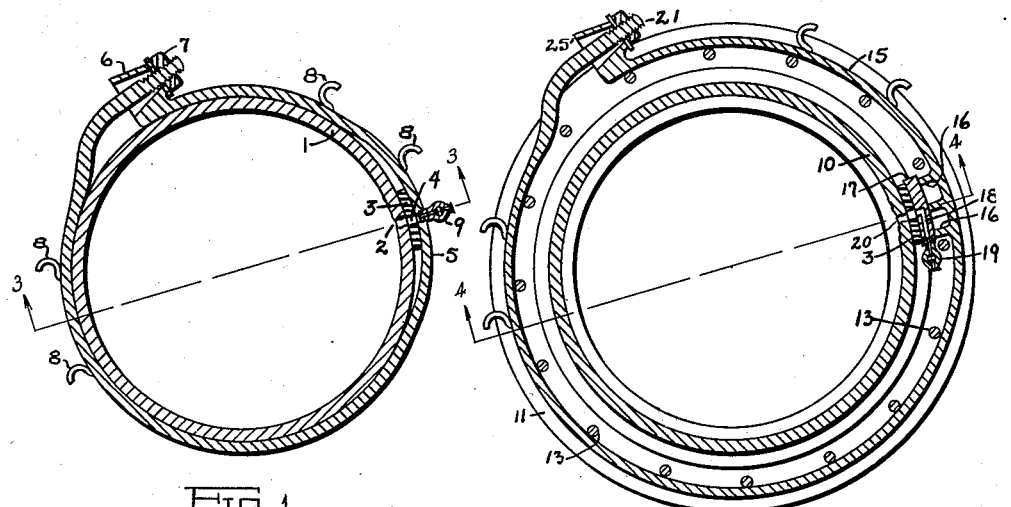
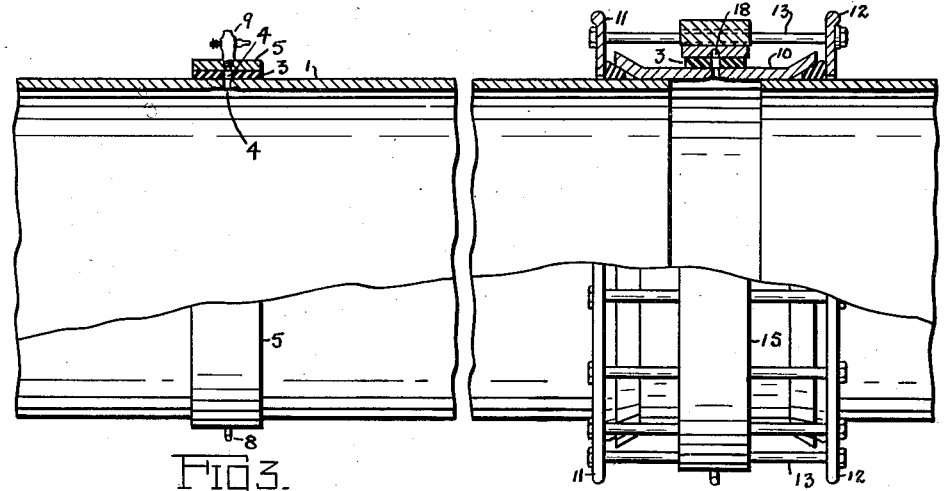
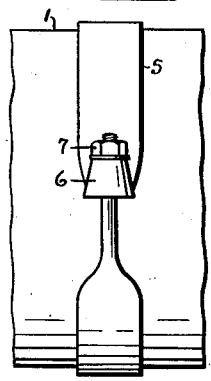
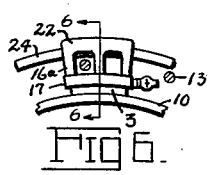
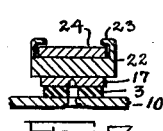
William F. Bronsell
INVENTOR.
BY
ATTORNEY.

Patented July 7, 1936

2,046,766

UNITED STATES PATENT OFFICE 2,046,766

PIPE PATCHING DEVICE

William F. Bronsell, Edna, Tex.

Application May 19, 1934, Serial No. 726,470

2 Claims. (Cl. 138—99)

This invention relates to means for repairing leaking pipes, and will be found particularly useful on gas pipe lines.

When a gas pipe line through which a city is being supplied with gas develops a leak, the gas cannot be shut off, and so the pipe must be repaired while the gas is passing therethrough. The pressure thereof may be five or six hundred pounds per square inch, and if a leak occurs and the gas issuing therefrom is ignited, the flame may ascend several hundred feet in the air, and this is frequently the cause of lost lives and property damage.

Heretofore certain sleeves have been used in repairing leaks in high pressure lines in cases where it is impossible or impracticable to shut off the line while making the repair. These sleeves are so designed that the gas may escape until after the sleeve has been applied to the leaking pipe, so that no pressure can accumulate while it is being put on, the final step being to close an opening in the sleeve through which the gas escapes during the application of the sleeve to the pipe. These sleeves are unnecessarily expensive because they are made sufficiently large to seal the entire pipe on opposite sides of the leak, and the application thereof to an average size line (14 or 16 inch diameter) requires the work of four men for about a day.

The present invention has for its object the provision of a very cheap, simple and effective patching device that may be quickly and easily applied without danger of ignition of the gas issuing from the hole in the pipe, and to securely seal said hole to render impossible further leakage of gas therethrough.

A specific object of the present invention is to apply the patch to a leaking pipe or coupling only at the point or points where it is needed.

Other objects will hereinafter appear.

The preferred embodiments of the invention are illustrated by the accompanying drawing.

Figs. 1, 3 and 5 illustrate one embodiment, Fig. 1 being a sectional elevation of a pipe with the patching device applied thereto; Fig. 3, a section on the line 3—3 of Fig. 1; and Fig. 5, a side elevation showing the meeting ends of the strap.

Another embodiment is shown by Figs. 2 and 4 wherein Fig. 2 is a vertical section of a pipe coupling with the pipe patching device applied thereto, and Fig. 4, a section on the line 4—4 of Fig. 2.

A third embodiment of the invention is illustrated by Figs. 6 and 7, of which Fig. 6 is a detail view of a modified form of the pad-holding element, and Fig. 7, a section on the line 6—6 of Fig. 6.

Fig. 8 is a perspective view of the sealing pad.

Referring first to Figs. 1, 3, 5 and 8, the pipe to be repaired is indicated at 1, and has a hole 2.

The sealing pad 3 which has therein an opening 4 is placed as shown upon the pipe 1, so that its opening 4 communicates with the hole 2 in the pipe. The numeral 5 indicates a strap, one end of which has a flared sleeve 6 for the reception of the other end which is secured therein by a nut 7. The numerals 8 indicate hooks to which chains (not shown) may be attached to effect the insertion of the end of the strap in the sleeve 6 for engagement by the nut 7. The numeral 9 indicates a valve which is placed so that it communicates with the opening 4 in the pad 3.

When it is desired to patch the pipe 1 by closing the opening 2, the parts are placed on the pipe as shown by Figs. 1, 3 and 5, except that the valve 9 is left open so that the gas issuing from the hole 2 in the pipe may pass through the opening 4 in the sealing pad 3, and through the valve 9. If the valve 9 and opening 4 were not provided, the gas would escape between the pipe 1 and sealing pad 3 as the sealing pad 3 was compressed on the pipe 1 by the strap 5, and this would be objectionable because it would be extremely difficult to avoid the destruction of the pad 3 by the gas, and dangers incident thereto when the parts were assembled. In accordance with the present invention the gas issuing from the hole 2 is permitted to escape through the opening 4 in the pad 3 and through the valve 9 when the pad 3 is being compressed on the pipe 1 by the strap 5. The trouble and danger incident to preventing the escape of the gas between the pipe 1 and pad 3 is thereby eliminated and, if desired, the valve 9 may be connected to a pipe (not shown), through which the gas may be conveyed to a point remote from where the workmen are repairing the pipe, to eliminate all danger of ignition thereof.

After the strap 5 has been secured on the pipe 1 and the sealing pad 3 completely compressed, the valve 9 may then be closed to prevent the escape of gas therethrough. The gas cannot then escape past the pad 3 because the pad 3 has been fully compressed before the closure of the valve 9 to constitute an efficient seal.

Referring now to the embodiments shown by Figs. 2 and 4 which is adapted for use to patch a coupling, the coupling includes a sleeve indicated at 10, and a pair of rings 11 and 12 secured by bolts 13. The strap is indicated at 15 and has pad-holding means comprising inwardly projecting spaced ribs 16 and a plate 17, the latter of which is provided with a fluid duct 18 and valve 19 communicating with the opening in the pad 3 which is positioned over the hole 20 in the coupling sleeve 10.

The embodiment shown by Figs. 2 and 4 is applied substantially the same as that shown by Figs. 1, 3 and 5, the pad 3 being placed on the coupling 10 over the hole 20, the plate 17 being placed on the pad 3 so that the duct 18 and valve 19 communicate with the opening in said pad, and the strap positioned so that the ribs 16 bear against the plate 17. The valve 19 is left open as the parts are assembled to permit the escape of the gas through the hole 20, the opening in the pad 3, duct 18 and valve 19, and after the nut 21 has been tightened, the valve 19 is closed to seal the pipe.

The coupling disclosed is quite commonly used in gas pipe lines and the modified structure just described permits patching of the sleeve 10 thereof which is surrounded by the bolts 13.

In Figs. 6 and 7 the construction is the same as in Figs. 2 and 4, except that instead of having ribs 16 integral with strap 15, the ribs 16a are provided on a member 22 having flanges 23 engaging strap 24 so that the member 22 is circumferentially slidable on the strap 24 so that the plate 17 and pad 3 can be moved to cover the hole in the pipe coupling, and the nut 21 and sleeve 25 (Fig. 2) may be left at the upper part of the pipe so that the latter are accessible to the workmen. In other words, the strap may be positioned so that the sleeve 25 is at the upper part of the pipe where it is accessible to the workmen, and then, without disturbing the position of the sleeve 25, the member 22 may be moved on the strap 24 to support the plate 17 and pad 3 over the hole in the pipe, whereupon the nut 21 may be tightened to hold the parts in place.

The invention is not limited to the preferred embodiments herein disclosed. Various changes will occur to those skilled in the art, and may be made within the scope of the following claims:

I claim:

1. The combination with a pipe having a coupling, said coupling including a plurality of longitudinal radially spaced peripheral bolts, of a patching device for closing a hole in said coupling, including a sealing pad having an opening to communicate with said hole, a strap embracing said bolts, and a pad-holding device circumferentially slidable on said strap, extending radially inwardly to engage said pad, and having a valve therein communicating with said pad.

2. The combination with a pipe having a coupling, said coupling including a plurality of longitudinal radially spaced peripheral bolts, of a patching device for closing a hole in said coupling, including a sealing pad having an opening to communicate with said hole, a strap embracing said bolts, and a pad-holding device extending radially inwardly to engage said pad and having a valve therein communicating with said pad.

WILLIAM F. BRONSELL.